United States Patent [19]
Pierce

[11] Patent Number: 5,619,893
[45] Date of Patent: Apr. 15, 1997

[54] TUBE SQUARING MACHINE

[75] Inventor: Kenneth R. Pierce, Lake Zurich, Ill.

[73] Assignee: The E. H. Wachs Company, Wheeling, Ill.

[21] Appl. No.: 513,217

[22] Filed: Aug. 10, 1995

[51] Int. Cl.$^6$ ..................................................... B23B 5/16
[52] U.S. Cl. ................. 82/113; 82/123; 82/111; 408/102
[58] Field of Search ............................. 82/113, 123, 112, 82/111; 408/101, 102, 103, 104, 111

[56] References Cited

U.S. PATENT DOCUMENTS

| | | | |
|---|---|---|---|
| 4,090,805 | 5/1978 | Grimsley | 408/111 |
| 4,365,528 | 12/1982 | Astle | 82/113 |
| 4,437,366 | 3/1984 | Astle | 82/113 |
| 4,510,828 | 4/1985 | Bogaerts et al. | 82/112 |
| 4,592,681 | 6/1986 | Pennison et al. | 408/102 X |
| 4,867,021 | 9/1989 | Bogaerts et al. | 82/123 X |

*Primary Examiner*—M. Rachuba
*Assistant Examiner*—Henry W.H. Tsai
*Attorney, Agent, or Firm*—Patnaude, Videbeck & Marsh

[57] ABSTRACT

A squaring machine has an elongate generally cylindrical housing with an axially mounted motor at one end of the housing which rotates a shaft extending through the axis of the housing. The shaft is longitudinally moveable within the housing, and a non-rotatable inner sleeve is fitted around the shaft and is fixed for longitudinal movement with the shaft. The housing has a feed ring which is axially slidable but non-rotatably fixed around the tubular section, and a pin extends through a slot in the housing and the pin is connected to both the feed ring and the inner sleeve such that the feed ring, the inner sleeve, and the shaft move longitudinally in unison with respect to the housing. Rotation of a feed nut, which threadably engages the feed ring, causes axial movement of the feed ring along the tubular portion of the housing, and simultaneous axial movement of the shaft.

7 Claims, 3 Drawing Sheets

TUBE SQUARING MACHINE

The present invention relates to tube squaring machines, and in particular to an adjustable feed, and an improved collet for such machines.

BACKGROUND OF THE INVENTION

Tube squaring machines are required to precision cut a square surface at the end of a tube such that, a precision weld can be made for attachment of the end thereof. In many cases, a tube must be cut to an exact length, with the ends of the tube being square.

Existing squaring machines grip the end of the tube in a collet after which a machine tool is adjustably fed against the end of the tube to remove metal and leave the end square. Existing squaring machines, however, do not have a means of precision indexing the feed of the tool, and therefore the feed of such machines cannot be adjusted to remove a predetermined amount of metal. An operator will frequently perform a series of machining operations, each time machining off a small portion of the metal of the tube, removing the tube from the machine to measure its length and then machine off more metal until the desired length of the tube has been reached. If care is not exercised, too much metal may be removed and the piece rendered useless.

In existing squaring machines, the feed is controlled by a handle which is rotated and operates a cam that moves the tool against the end of a work piece. Such cam operated feeds do not provide a linear relationship between the advancement of the feed and the angle of the handle. As a result, an operator cannot determine the distance the feed has advanced by the angle through which the handle is rotated.

Furthermore, to cut a square end to a piece of tubing, the machine must attach to the end of the tubing so as to retain the tubing with the axis thereof coaxial with the axis of the drive shaft of the cutting tool. If the axis of the tubing is at an angle relative to the axis of the squaring machine, the machine will cut an end having a plane which will be angled, and not perpendicular to the length of the tube. A collet at the end of the machine is provided to clamp the end of the tube in the desired position.

Most existing collets are made of metal, and are tubular in shape with a number of longitudinal cuts extending from alternate ends of the tubular collet. A work piece of tubing is then fitted into the interior of the collet and the collet fitted into a tapered retainer in the housing of the tool, and held in place by a complementary tapered nut. Tightening of the nut compresses the collet and retains the work piece.

It has been found that it is difficult to insert a length of metal tubing into a metal collet because the diameter of the inner bore of the collet is nearly equal to the outer diameter of the work piece to be inserted therein. Furthermore, existing metal collets may damage surfaces of a work piece on which a highly polished surface is required.

Existing metal collets also permit very little expansion of the inner diameter from the compressed position in which the collet is locked against the outer surface of the work piece, and the relief position when the work piece can be removed from the collet.

It would, therefore, be desirable to provide a squaring machine for which the feed can be accurately measured and controlled. Also, it would be desirable to provide a collet for a tube squaring machine which will not mar the finish of a polished tubing, can be easily used, and will firmly grip and retain a work piece within the machine.

SUMMARY OF THE INVENTION

Briefly, the present invention is embodied in a squaring machine having an elongate generally cylindrical housing with an axially mounted motor attached to the first end of the housing.

A rotable shaft extends through the axis of the housing, one end of which is driven by the motor and the second end of the which is adapted to receive a squaring tool. The shaft is also adapted for longitudinal movement within the housing, and a non-rotatable inner sleeve is fitted around the shaft and is fixed for longitudinal movement with the shaft.

The housing has a tubular section and a feed ring which is axially slideable but non-rotatably fixed around the tubular section. A pin extends through a slot in the housing and the pin is connected to both the feed ring and the inner sleeve such that the feed ring, the inner sleeve, and the shaft move longitudinally in unison with respect to the housing.

The feed ring has external threads on the outer surface thereof, and a feed nut having complementary internal threads is threaded thereon. The feed nut is rotatably about its longitudinal axis, but is locked against axial movement along the housing. Rotation of the feed nut, therefore, causes axial movement of the feed ring along the tubular portion of the housing, and simultaneous axial movement of the shaft. An index on the feed nut provides a correlation between the angular rotation of the feed nut and the axial movement of the shaft.

At the second end of the housing is a tubular collet retainer which is coaxial with the axis of the shaft. The collet retainer has a frustoconically shaped inner surface for receiving a tapered collet. The outer surface of the retainer is threaded for receiving a complementarily threader retaining ring for compressing the collet within the frustoconical retainer.

In accordance with the present invention, the collet, in assembled form, has a generally frustoconical body with the axial bore sized to receive a given diameter of tubing. In the preferred embodiment the body of the collet consists of first and second body portions, each of the body portions being a frustoconical half section with a wide end and a narrow end and an elongate axial groove along the inner surface thereof which, when the complementary portions are mated, the mated grooves form the bore for receiving a work piece. A C-ring is attached to each of the first and second body portions to align the portions to form a single frustoconical body. Each of the body portions has at least one elongate radial cut through the outer wall thereof which extends to a location near the groove. In the preferred embodiment, the body portions are made of a plastic which can grip the surface of a work piece, but has a hardness which is less than the hardness of the metal of which tubing is made so as to not cause unnecessary wearing to the surface thereof.

GENERAL DESCRIPTION OF THE DRAWINGS

A better and more complete understanding of the present invention will be had from a reading of the following detailed description taken in conjunction with the accompanying drawings wherein.

DETAILED DESCRIPTION OF A PREFERRED EMBODIMENT

Figure 1:
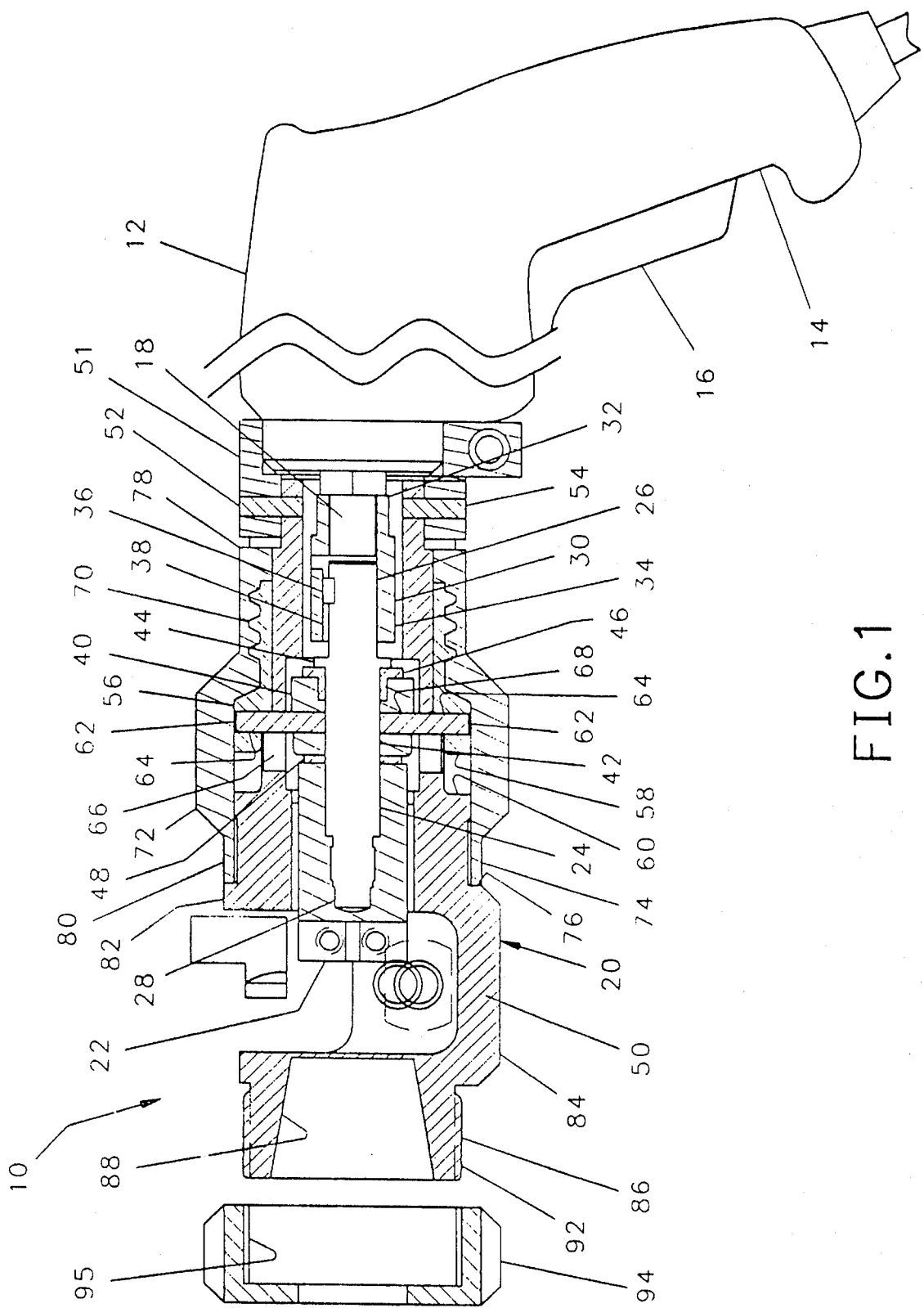
FIG. 1 is a cross-sectional view of a tube squaring machine in accordance with the present invention with the collet removed.

Referring to FIG. 1, a tube squaring machine 10 is driven by a motor unit 12 having a handle 14 and trigger 16 of the type commonly provided on a typical hand drill. The motor unit 12 has an output shaft 18 which is connected to a drive assembly 20 as described below to rotate a tool, not shown, in a tool retainer 22.

The drive assembly 20 includes an inner shaft 24 witch a first end 26 and a second end 28 to which is attached the tool retainer 22. The shaft 24 is coaxial with the shaft 18 of the motor unit 12 and fitted around the first end 26 and the motor shaft 18 is a first sleeve 30 having a first end 32 with internal threads for attachment to complementary external threads on the shaft 18. The second end 34 of the first sleeve 30 has an inner diameter which is a little larger than the outer diameter of the first end 26 of the shaft 24 such that the shaft 24 is axially slideable within the sleeve 30, and a key 36 fixed to the shaft 24 is positioned within a key slot 38 in the inner surface of the sleeve 30. Accordingly, rotational movement of the motor shaft 18 will rotate the first sleeve 30 and drive the first shaft 24 through the key 36.

A second sleeve 40 is positioned around the central portion 42 of the shaft 24 and has a smooth inner bore with a diameter a little larger than the outer diameter of the central portion 42 of the shaft such that the shaft 24 is free to rotate within the sleeve 40. The second sleeve 40 is retained against axial movement relative to the shaft 24 by an annual shoulder 44 on the shaft which abuts one end of the sleeve 40, and by the tool retainer 22 which abuts the other end of the sleeve 40. A first and second bearing 46, 48, one at each end of the second sleeve 40 enables the shaft 24 to rotate within the first sleeve 40 with a minimum of resistance.

Surrounding the shaft 24, and the first and second sleeves 30, 40, is a generally tubular housing 50 which is fixedly attached to a collar 51 on the housing of the motor unit 12 by a pair of roll pins 52, 54. Surrounding the central portion of the housing 50 is an annual feed ring 56 which is axially slideable along a portion of the length of the housing 50, such that the feed ring 56 can move from a first withdrawn position as shown in FIG. 1 to a second forward position in which the forward end 58 of the feed ring 56 abuts against an annual surface 60 of the housing 50.

A pair of identical pins, 62 are positioned 180 degrees apart from one another around the axis of the drive assembly 20, and each pin 62 extends radially through a radial hole 64 in the feed ring 56, through an elongate axial slot 66 in the housing and into a radial hole 68 in the second sleeve 40. The pins 62 are longitudinally moveable within the slots 66 and as a result the second sleeve 40 and the feed ring 56 are retained against rotation with the shaft 24 and are moved axially in unison with each other, such that axial movement of the feed ring 56 will cause axial movement of the shaft 24 and of the tool retainer 22.

The outer surface of the feed ring 56 includes a threaded portion 70 and fitted over the threaded portion 70 of the feed ring is a feed nut 72. The forward end 74 of the feed nut 72 abuts against an annual shoulder 76 of the housing 50 and the rearward end 78 abuts against the forward end of the collar 51. As a result, the feed nut 72 is rotatable around the housing 50, but is not axially moveable along the length thereof. Rotation of the feed nut 72 will therefore cause axial movement of the feed ring 56, and corresponding axial movement of the shaft 24 and tool retainer 22. Furthermore, there is a linear relationship between the angular rotation of the feed nut 72 and the axial movement of the shaft 24 and tool holder 22. Indices 80 on the outer surface of the feed nut 72 and an indicator line 82 on the housing 50 enable an operator to move the tool holder 22, and any tool attached thereto, a given axial distance by rotating the feed nut 72 through a corresponding angular rotation shown by the indices 80.

At the forward end of the housing 50 is an arm 84 and at the forward end of the arm 84 is a tubular collet retainer 86 having a frustoconical inner surface 88 for retaining a collet, not shown, in axial alignment with the shaft 24. The outer surface of the collet retainer 86 has a threaded portion 92 over which is fitted a collet retaining nut 94 having inner threads 95 complementary to the threaded portion 92 of the collet retainer 86.

Figure 3:
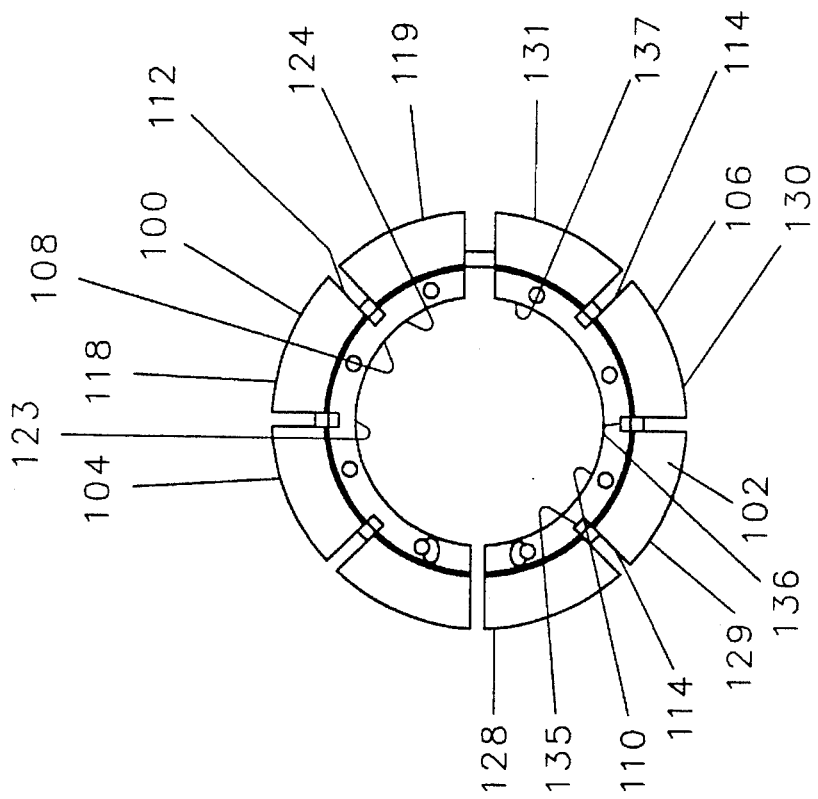
FIG. 3 is an end view of the collet showing in FIG. 2.
Figure 2:
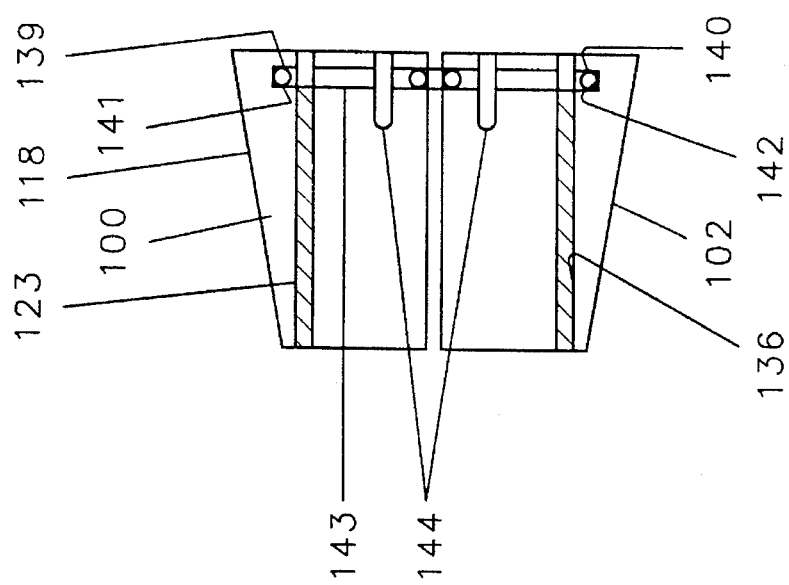
FIG. 2 is an enlarged cross-sectional view of a collet in accordance with the present invention.

Referring to FIG. 2 and 3, a collet 96 for insertion into the collet retainer 86 is shown. The collet 96 has a first and a second body portions 100,102 respectively, the outer surfaces 104, 106 of which are each frustoconical half sections. Each of the inner surfaces respectively of the body portions 100,102 has an elongate longitudinally oriented arcuate groove 108,110 such that when the body portions 100,102 are mated against each other the outer surfaces 104,106 of the assembled pieces form a generally frustoconical outer surface which is complimentary to the frustoconical inner surface of the collet retainer 86 of the machine 10, and the grooves 108,110 of the inner surfaces form a generally cylindrical opening for tightly retaining a work piece fitted through the axis thereof. A collet is required for each of the commonly available diameters of tubing, such as ½ inch, ¾ inch etc.

Extending radially inward through the outer surface 104 of the first body portion 100 are a plurality of cuts 112, and extending radially inward through the outer surface 106 of the second body portion 102 are a corresponding plurality of cuts 114 along the length thereof. As can be seen from FIG. 3, the cuts 112,114 do not extend to the inner surfaces 108,110, respectively. Referring to the first body portion 100, cuts 112 divide the first body portion 100 into a plurality of wedged segments 116,117,118,119, which remain in attachment to one another by the unsevered sections 122,123,124. In similar fashion, second body portion 102 has radial cuts 114 which divide the second body portion 102 into corresponding wedge segments 128,129, 130,131 which are joined together by unsevered sections 135,136,137.

As best shown in FIG. 2, around one end of the assembled first and second body portions 100,102 is an annular lip 139,140 respectively and along the inner surface of each of the lips 139,140, is an annual groove 141,142 for retaining a C ring 143. The C ring 143 is retained within the grooves 139,140 by a plurality of pins 144. The C ring retains the first and second body portions 102,104 in parallel, spaced relationship to each other with the outer surfaces 104,106 thereof defining a frustoconical surface, and the inner surfaces 108,110 defining an inner axial opening through which a work piece can be inserted.

As can be best seen in FIGS. 2,3, the first and second body portions 102,104 are sized such that when they are retained around the C ring 143, each of the body portions 100,102 defines an arc of less than 180 degrees of the C ring, such that the ends of the body portions are spaced a short distance from each other. A spacing of ¹⁄₁₆th inch between the body parts 100, 102 is sufficient for a collet having an outer diameter of about two inches. As a result, when the collet 96 is inserted into the frustoconical collet retainer 86 and compressed by the retaining nut 94 the body portions 100,102 can move towards each other and will slide along the C ring 104 with the segments 116,117,118,119,128, 129,130,131 retained in axial alignment with each other. As the nut 94 is tightened all the segments will radially converge at an equal rate causing the inner surface 108,110 to apply equal compressive forces around a work piece there between.

In the preferred embodiment, the collet 96 is made of a durable plastic such that the unsevered sections 122,123, 124,135, 136,137 thereof will retain the wedge segments of each body portion attached to one another and the circumference of the inner surfaces of the wedge segments can be constricted within the collet retainer 86. It should be further appreciated that a plastic collet has a hardness less than the hardness of metal and therefore it will not mar a polish of a work piece which is retained thereby.

Figure 5:
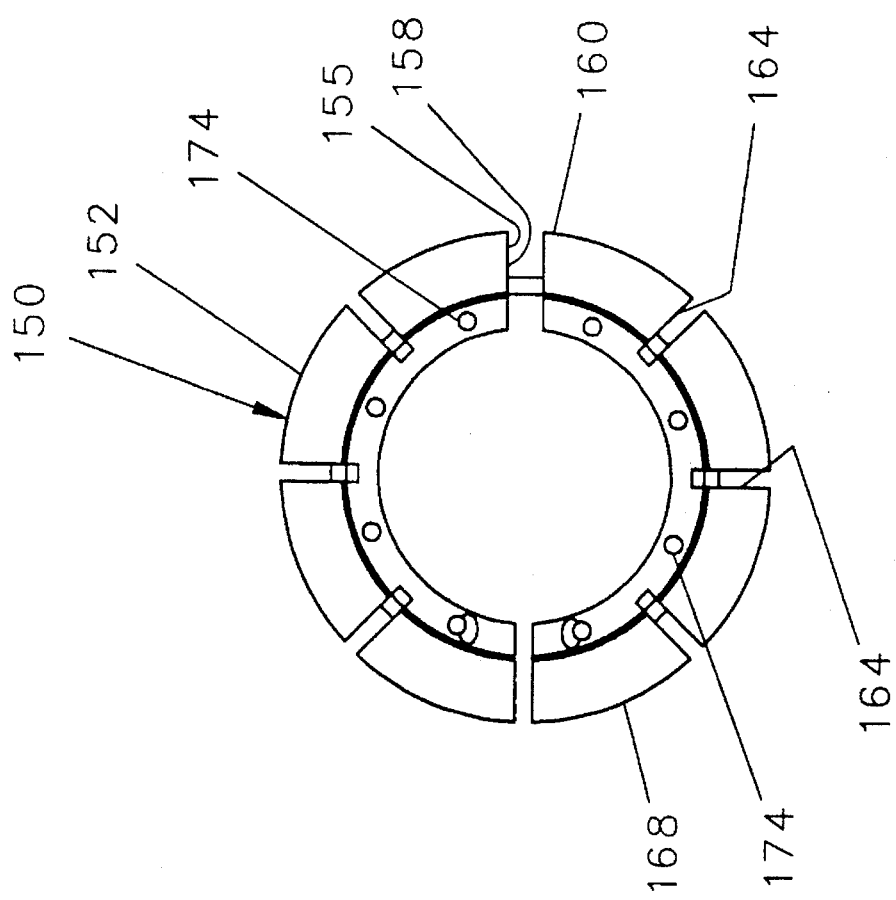
FIG. 5 is an end view of a second embodiment of a collet in accordance with the present invention.
Figure 4:
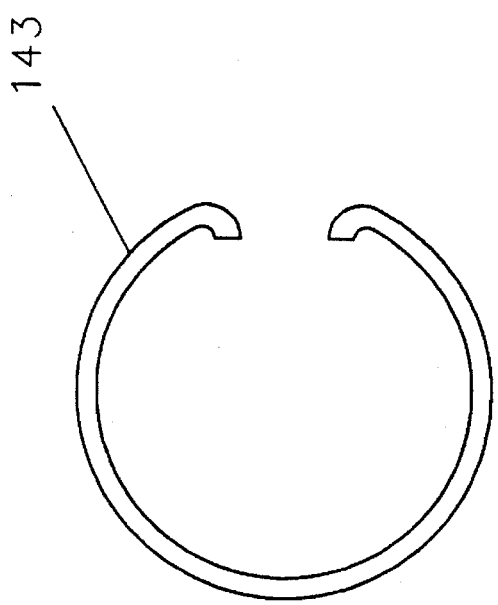
FIG. 4 is a plan view of a C spring for retaining the collet in FIG. 2 in assembled relationship.

Referring to FIG. 5, a collet 148 may also be constructed having a single body portion 150 with a generally frusto-conical outer surface 152 and cylindrical inner opening 154. In this embodiment, the single body portion 150 has an elongate radial cut 155 extending from the outer surface 152 to the inner opening 154 such that the collet is generally "C" shaped with the ends 158,160 of the "C" formed by the cut 155. As in the prior embodiment, the body 150 further has a plurality of radial cuts 164 through the outer surface 152 thereof which do not extend to the inner surface 154. A retaining C ring 143 is fitted within an annual inner groove, not visible, around the inner surface of an annular lip 170 around the one end of the body 150 to retain the collet 148 in the desired configuration. As with the prior embodiment, the C ring 143 is retained within the Groove by a plurality of pins 174. When the body 150 is fitted on the C ring 143, the ends 158,160 of the body 150 are spaced a short distance from each other, and the body 150 is sized such that when it is inserted into the collet retainer 86 it will be constricted around a work piece as the retaining nut 94 is tightened.

A tube squaring machine in accordance with the present invention can be used to remove a predetermined amount of material from the end of a length of tube so that the tube will be cut to the length desired. If, for example, an operator determines that a length of tube is twenty hundredth of an inch too long, he can remove the excess length by positioning the work piece in a collet and retaining it in the collet retainer. Thereafter the feed ring is rotated until the cutting tool is in contact with the end of the work piece, and the position of the tool is noted on the indices. Thereafter the tool is moved twenty hundredth of an inch while cutting the work piece by rotating the feed nut 72 through a turn which corresponds to that movement of the tool.

While the present embodiment has been described in connection with a plurality of embodiments, it will be understood that many changes and modifications thereof may be made without departing from the true spirit and scope of the present invention, and it is intended by the pending claims to cover all such changes and modifications which come within the true spirit and scope of the invention.

I claim:

1. A tube squaring machine comprising in combination, a housing having a first end, a second end, and a tubular section between said first and second ends, a rotatable shaft within said housing, said shaft axially moveable relative to said housing, a sleeve non rotatably fitted around said shaft, means for retaining said sleeve for axial movement with said shaft, a feed ring non rotatably fitted around said housing, said feed ring axially slideable along said housing, said feed ring having a cylindrical surface with threads thereon, a feed nut having a cylindrical surface with threads thereon from mating against said threads of said feed ring, means for locking said feed nut against axial movement along said housing, said housing having a longitudinal slot therein, linkage means extending through said slot in said housing for axially moving said sleeve in unison with axial movement of said feed ring, means for retaining a work piece at said first end of said housing, means for attaching a first end of said shaft to an axially aligned rotating member, and means for attaching a tool to a second end of said shaft.

2. A machine in accordance with claim 1 further comprising, connecting means for connecting said shaft to a shaft of a motor.

3. A machine in accordance with claim 1 further comprising indexing means on said housing and said feed nut for indexing rotational movement of said feed nut with axial movement of said shaft.

4. A tube squaring machine in accordance with claim 1 wherein said means for retaining is positioned to retain a workpiece coaxially with an axis of said shaft.

5. A machine in accordance with claim 4 further comprising indexing means on said housing and said feed nut for indexing rotational movement of said feed nut with axial movement of said shaft.

6. A machine in accordance with claim 5 and further comprising means for attaching a second end of said shaft to a rotating member.

7. A tube squaring machine comprising in combination, a housing having a first end, a second end, and a tubular section between said first and second ends, a rotatable shaft within said housing, said shaft axially moveable relative to said housing, a sleeve non rotatably fitted around said shaft, means for retaining said sleeve for axial movement with said shaft, a feed ring non rotatably fitted around said housing, said feed ring axially slideable along said housing, said feed ring having a cylindrical surface with threads thereon, a feed nut having a cylindrical surface with threads thereon from mating against said threads of said feed ring, means for locking said feed nut against axial movement along said housing, said housing having an aperture therein, linkage means extending through said aperture in said housing for axially moving said sleeve in unison with axial movement of said feed ring, means for retaining a work piece at said first end of said housing, means for attaching a first end of said shaft to an axially aligned rotating member, and means for attaching a tool to a second end of said shaft.

* * * * *

UNITED STATES PATENT AND TRADEMARK OFFICE
CERTIFICATE OF CORRECTION

PATENT NO. : 5,619,893
DATED : April 15, 1997
INVENTOR(S) : Kenneth R. Pierce

It is certified that error appears in the above-indentified patent and that said Letters Patent is hereby corrected as shown below:

In column 1, line 8, after "that" delete ","

In column 5, line 18, after "the" second occurrence, delete "Groove" and substitute --groove--.

In column 5 line 59, after "thereon " delete "from" and substitute --for--.

In column 6, line 44 after "thereof" delete "from" and substitute --for--.

Signed and Sealed this

Second Day of September, 1997

Attest:

Attesting Officer

BRUCE LEHMAN

Commissioner of Patents and Trademarks